(12) United States Patent
Takeyama (10) Patent No.: US 10,879,545 B2
(45) Date of Patent: Dec. 29, 2020

(54) FUEL CELL SYSTEM AND ABNORMALITY DIAGNOSIS METHOD FOR FUEL CELL SYSTEM

(71) Applicant: TOYOTA JIDOSHA KABUSHIKI KAISHA, Toyota (JP)

(72) Inventor: Makoto Takeyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 220 days.

(21) Appl. No.: 16/058,312

(22) Filed: Aug. 8, 2018

(65) Prior Publication Data

US 2019/0081338 A1 Mar. 14, 2019

(30) Foreign Application Priority Data

Sep. 13, 2017 (JP) ................................. 2017-175394

(51) Int. Cl.
*H01M 8/04664* (2016.01)
*H01M 8/0438* (2016.01)
*H01M 8/04746* (2016.01)

(52) U.S. Cl.
CPC ... *H01M 8/04671* (2013.01); *H01M 8/04388* (2013.01); *H01M 8/04753* (2013.01)

(58) Field of Classification Search
CPC ......... H01M 8/04671; H01M 8/04753; H01M 8/04388; H01M 8/04328; H01M 8/04343; H01M 8/04664
See application file for complete search history.

(56) References Cited

U.S. PATENT DOCUMENTS

| 2009/0239105 A1* | 9/2009 | Yoshida | ............ H01M 8/04432 429/424 |
| 2016/0301090 A1* | 10/2016 | Mitsui | ............... H01M 8/04679 |

FOREIGN PATENT DOCUMENTS

| JP | 2006-252928 | 9/2006 |
| JP | 2008-153079 | 7/2008 |
| JP | 2008-218242 | 9/2008 |
| JP | 2010-257859 | 11/2010 |

* cited by examiner

*Primary Examiner* — Lisa S Park
(74) *Attorney, Agent, or Firm* — Finnegan, Henderson, Farabow, Garrett & Dunner, LLP (57) ABSTRACT

A fuel cell system includes: a fuel cell; an air passage including an air supply passage and an air exhaust passage; an air inlet valve configured to open and close the air supply passage; an air outlet valve configured to open and close the air exhaust passage; a hydrogen gas passage including a hydrogen gas supply passage and a hydrogen gas exhaust passage; a hydrogen gas inlet valve configured to open and close the hydrogen gas supply passage; a hydrogen gas outlet valve configured to open and close the hydrogen gas exhaust passage; a hydrogen gas pressure sensor configured to obtain a pressure of gas in the hydrogen gas passage disposed downstream of the hydrogen gas inlet valve and upstream of the hydrogen gas outlet valve; and a controller.

9 Claims, 9 Drawing Sheets

FUEL CELL SYSTEM AND ABNORMALITY DIAGNOSIS METHOD FOR FUEL CELL SYSTEM

INCORPORATION BY REFERENCE

The disclosure of Japanese Patent Application No. 2017-175394 filed on Sep. 13, 2017 including the specification, drawings and abstract is incorporated herein by reference in its entirety.

BACKGROUND

1. Technical Field

The present disclosure relates to a fuel cell system and an abnormality diagnosis method for a fuel cell system.

2. Description of Related Art

Regarding a fuel cell system, for example, Japanese Unexamined Patent Application Publication No. 2008-153079 (JP 2008-153079 A) discloses a fuel cell system including a hydrogen gas passage, a hydrogen gas inlet shutoff valve, a hydrogen gas outlet shutoff valve, an air passage, an air inlet shutoff valve, an air outlet shutoff valve, and an air pressure sensor. In the fuel cell system, the air inlet shutoff valve and the air outlet shutoff valve are closed to seal the air passage after stopping the fuel cell system. Next, whether or not the air inlet shutoff valve or the air outlet shutoff valve is closed normally is determined based on a pressure obtained by the air pressure sensor provided in the air passage.

SUMMARY

In the fuel cell system disclosed in JP 2008-153079 A, the air pressure sensor is provided in the air passage in order to determine whether or not the air inlet shutoff valve or the air outlet shutoff valve is closed normally. Therefore, the fuel cell system is complex.

A first aspect of the disclosure relates to a fuel cell system including a fuel cell, an air passage, an air inlet valve, an air outlet valve, a hydrogen gas passage, a hydrogen gas inlet valve, a hydrogen gas outlet valve, a hydrogen gas pressure sensor, and a controller. The air passage includes an air supply passage through which air is supplied to the fuel cell and an air exhaust passage through which air is exhausted from the fuel cell. The air inlet valve is configured to open and close the air supply passage. The air outlet valve is configured to open and close the air exhaust passage. The hydrogen gas passage includes a hydrogen gas supply passage through which hydrogen gas is supplied to the fuel cell and a hydrogen gas exhaust passage through which hydrogen gas is exhausted from the fuel cell. The hydrogen gas inlet valve is configured to open and close the hydrogen gas supply passage. The hydrogen gas outlet valve is configured to open and close the hydrogen gas exhaust passage. The hydrogen gas pressure sensor is configured to obtain a pressure of gas in the hydrogen gas passage disposed downstream of the hydrogen gas inlet valve and upstream of the hydrogen gas outlet valve. The controller is configured to estimate whether or not the air inlet valve and the air outlet valve are closed normally based on a state of a decrease in the pressure obtained by the hydrogen gas pressure sensor after causing the hydrogen gas inlet valve, the hydrogen gas outlet valve, the air inlet valve, and the air outlet valve to be closed. According to the first aspect of the disclosure, whether or not the air inlet valve and the air outlet valve are closed normally can be estimated based on a state of a decrease in the pressure of gas in the hydrogen gas passage obtained by the hydrogen gas pressure sensor. Therefore, whether or not the air inlet valve and the air outlet valve are closed normally can be estimated without disposing an air pressure sensor for obtaining the pressure of gas in the air passage. Thus, the structure of the fuel cell system can be simplified.

In the fuel cell system according to the first aspect of the disclosure, when a predetermined period is elapsed after causing the hydrogen gas inlet valve, the hydrogen gas outlet valve, the air inlet valve, and the air outlet valve to be closed, the controller may be configured to estimate that the air inlet valve and the air outlet valve are closed normally in a case where the decreased pressure is lower than or equal to a predetermined value, and to estimate that at least one of the air inlet valve or the air outlet valve is not closed normally in a case where the decreased pressure is not lower than or equal to a predetermined value. According to the first aspect of the disclosure, whether or not the air inlet valve and the air outlet valve are closed normally can be easily estimated by a simple comparison operation.

In the fuel cell system according to the first aspect of the disclosure, wherein the predetermined value may be a value determined based on the decreased pressure when the predetermined period is elapsed in a case where the air inlet valve, the air outlet valve, the hydrogen gas inlet valve, and the hydrogen gas outlet valve are closed normally. According to the first aspect of the disclosure, whether or not the air inlet valve and the air outlet valve are closed normally can be accurately estimated based on the pressure in a case where the air inlet valve and the air outlet valve are closed normally.

In the fuel cell system according to the first aspect of the disclosure, in a predetermined period in which the pressure decreases after causing the hydrogen gas inlet valve, the hydrogen gas outlet valve, the air inlet valve, and the air outlet valve to be closed, the controller may be configured to estimate that at least one of the air inlet valve or the air outlet valve is not closed normally in a case where a period in which the pressure increases is present, and to estimate that the air inlet valve and the air outlet valve are closed normally in a case where a period in which the pressure increases is not present. According to the first aspect of the disclosure, whether or not the air inlet valve and the air outlet valve are closed normally can be easily estimated based on whether or not an increase in the pressure is present.

The fuel cell system according to the first aspect of the disclosure may further include a compressor configured to supply compressed air to the fuel cell, the compressor being disposed upstream of the air inlet valve of the air passage. The controller may be configured to drive the compressor in a case where the controller estimates that at least one of the air inlet valve or the air outlet valve is not closed normally. According to the first aspect of the disclosure, in a case where at least one of the air inlet valve or the air outlet valve is not closed normally by foreign matter in the air (hereinafter, referred to as "foreign matter") being embedded therein, the foreign matter can be removed by driving the compressor.

The fuel cell system according to the first aspect of the disclosure may further include a temperature sensor configured to obtain a temperature of gas in the hydrogen gas passage. The controller may be configured to estimate whether or not the air inlet valve and the air outlet valve are closed normally based on the pressure obtained by the hydrogen gas pressure sensor in a case where the temperature obtained by the temperature sensor is lower than or equal to a predetermined value. According to the first aspect of the disclosure, in a case where whether or not the air inlet valve and the air outlet valve are closed normally is estimated using the pressure of gas in the hydrogen gas passage obtained by the hydrogen gas pressure sensor, an effect of the temperature on the change of the pressure in the hydrogen gas passage can be further suppressed. Therefore, whether or not the air inlet valve and the air outlet valve are closed normally can be more appropriately estimated.

The fuel cell system according to the first aspect of the disclosure may further include an alarm portion configured to alarm that at least one of the air inlet valve or the air outlet valve is not closed normally. The controller may be configured to cause the alarm portion to alarm an abnormality in a case where the controller estimates that at least one of the air inlet valve or the air outlet valve is not closed normally. According to the first aspect of the disclosure, in a case where the air inlet valve and the air outlet valve are not closed normally, the alarm portion alarms the abnormality. Therefore, the alarm portion can urge a user to repair or inspect the fuel cell system.

A second aspect of the disclosure relates to an abnormality diagnosis method for a fuel cell system. The abnormality diagnosis method includes: obtaining a pressure of gas in a hydrogen gas passage disposed downstream of a hydrogen gas inlet valve and upstream of a hydrogen gas outlet valve after causing the hydrogen gas inlet valve, the hydrogen gas outlet valve, an air inlet valve, and an air outlet valve to be closed, the hydrogen gas inlet valve being configured to open and close a hydrogen gas supply passage through which hydrogen gas is supplied to a fuel cell, the hydrogen gas outlet valve being configured to open and close a hydrogen gas exhaust passage through which hydrogen gas is exhausted from the fuel cell, the air inlet valve being configured to open and close an air supply passage through which air is supplied to the fuel cell, and the air outlet valve being configured to open and close an air exhaust passage through which air is exhausted from the fuel cell; and estimating whether or not the air inlet valve and the air outlet valve are closed normally based on a state of a decrease in the obtained pressure.

According to the disclosure, the disclosure can also be realized in various forms other than a fuel cell system. For example, the disclosure can be realized in forms such as a fuel cell vehicle or a control method for a fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
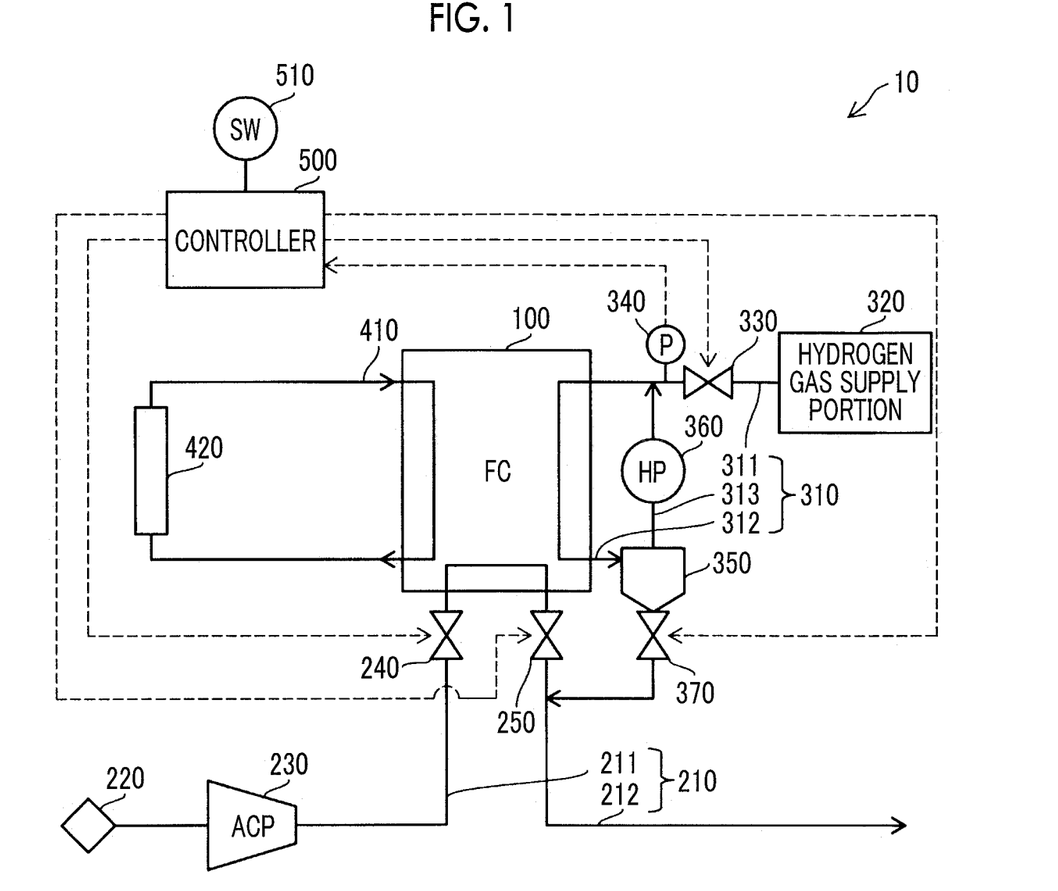
FIG. 1 is a diagram showing the summary of a fuel cell system according to a first embodiment.

FIG. 1 is a diagram showing the summary of a fuel cell system 10 according to a first embodiment. The fuel cell system 10 according to the first embodiment is mounted on, for example, a fuel cell vehicle and is used as a power generation device for driving a drive motor of the fuel cell vehicle. The fuel cell system 10 may be used as a stationary power generation device. The fuel cell system 10 includes a fuel cell 100, an air passage 210, a hydrogen gas passage 310, and a controller 500.

The fuel cell 100 according to the first embodiment is a solid polymer fuel cell. The fuel cell 100 has a stack structure in which a plurality of cells is stacked. Each of the cells includes: a membrane electrode assembly in which an electrode catalyst layer is provided on opposite surfaces of an electrolyte membrane; and a pair of separators between which the membrane electrode assembly is interposed. In each of the cells, hydrogen gas as fuel gas is supplied to an anode side of the membrane electrode assembly, and air as oxidizing gas is supplied to a cathode side. As a result, an electromotive force is generated by an electrochemical reaction. The respective cells are connected in series to each other. In the first embodiment, a coolant passage 410 through which a coolant for cooling the fuel cell 100 circulates is connected to the fuel cell 100. Heat in the coolant circulating through the coolant passage 410 is dissipated by a radiator 420.

The air passage 210 includes: an air supply passage 211 through which air is supplied to the fuel cell 100; and an air exhaust passage 212 through which air is exhausted from the fuel cell 100. In the air supply passage 211, an air cleaner 220, a compressor 230, and an air inlet valve 240 are disposed in this order from the upstream side. In the air exhaust passage 212, an air outlet valve 250 is disposed.

The air cleaner 220 removes foreign matter in air and introduces air into the air supply passage 211.

The compressor 230 compresses the air introduced from the air cleaner 220 into the air supply passage 211 and supplies the compressed air to the fuel cell 100. As the compressor 230, for example, a supercharger or a Roots pump can be used. In order to cool the high-temperature air compressed by the compressor 230, an intercooler may be disposed downstream of the compressor 230.

The air inlet valve 240 is disposed in the air supply passage 211 between the compressor 230 and the fuel cell 100. The air inlet valve 240 is a valve for opening and closing the air supply passage 211.

The air outlet valve 250 is a valve for opening and closing the air exhaust passage 212. The controller 500 can adjust a pressure of air flowing through the cathode side in the fuel cell 100 by adjusting an opening degree of the air outlet valve 250.

The hydrogen gas passage 310 includes: the hydrogen gas supply passage 311 through which hydrogen gas is supplied to the fuel cell 100; and the hydrogen gas exhaust passage 312 through which hydrogen gas is exhausted from the fuel cell 100. In the first embodiment, the hydrogen gas passage 310 includes a hydrogen gas circulation passage 313 for circulating the hydrogen gas exhausted from the fuel cell 100 back to the fuel cell 100. In the hydrogen gas supply passage 311, a hydrogen gas supply portion 320, the hydrogen gas inlet valve 330, and the hydrogen gas pressure sensor 340 are disposed in this order from the upstream side. In the hydrogen gas exhaust passage 312, a gas-liquid separator 350 and the hydrogen gas outlet valve 370 are disposed in this order from the upstream side. In the hydrogen gas circulation passage 313, a hydrogen pump 360 is disposed.

The hydrogen gas supply portion 320 supplies hydrogen gas into the hydrogen gas supply passage 311. In the first embodiment, the hydrogen gas supply portion 320 includes: a hydrogen tank in which hydrogen is stored; and a main stop valve of the hydrogen tank. The main stop valve is a valve for opening and closing a connection portion between the hydrogen tank and the hydrogen gas supply passage 311.

The hydrogen gas inlet valve 330 is disposed in the hydrogen gas supply passage 311 between the hydrogen gas supply portion 320 and the fuel cell 100. The hydrogen gas inlet valve 330 is a valve for opening and closing a hydrogen gas supply passage 311. The hydrogen gas inlet valve 330 can be configured as, for example, an injector.

The hydrogen gas pressure sensor 340 is disposed in the hydrogen gas passage 310 disposed downstream of the hydrogen gas inlet valve 330 and upstream of the hydrogen gas outlet valve 370. The hydrogen gas pressure sensor 340 is a sensor for obtaining a pressure P of gas in the hydrogen gas passage 310. The controller 500 controls the opening degree of the hydrogen gas inlet valve 330 using the pressure P obtained by the hydrogen gas pressure sensor 340 such that the amount of hydrogen gas supplied to the fuel cell 100 can be adjusted.

The gas-liquid separator 350 separates water produced by power generation of the fuel cell 100 from the hydrogen gas (anode off gas) exhausted from the fuel cell 100.

The hydrogen pump 360 introduces the hydrogen gas from which the produced water is separated by the gas-liquid separator 350 again into the downstream side of the hydrogen gas inlet valve 330 of the hydrogen gas supply passage 311 through the hydrogen gas circulation passage 313, and circulates the hydrogen gas to the fuel cell 100.

The hydrogen gas outlet valve 370 is disposed in the hydrogen gas exhaust passage 312 between the gas-liquid separator 350 and the air exhaust passage 212. The hydrogen gas outlet valve 370 is a valve for opening and closing the hydrogen gas exhaust passage 312. The controller 500 causes the hydrogen gas outlet valve 370 to be open such that the produced water and the anode off gas separated by the gas-liquid separator 350 can be exhausted. The produced water and the anode off gas exhausted from the hydrogen gas outlet valve 370 flows to the downstream side of the air outlet valve 250 in the air exhaust passage 212 and is exhausted to the outside of the fuel cell system 10.

The controller 500 is configured as a computer including a central processing unit (CPU), a memory, and an interface circuit through which the respective components are connected. The CPU executes a control program stored in the memory such that whether or not the air inlet valve 240 and the air outlet valve 250 are closed normally can be estimated based on a state of a decrease in the pressure P of gas in the hydrogen gas passage 310 obtained by the hydrogen gas pressure sensor 340. In the first embodiment, the controller 500 controls the opening and closing of the air inlet valve 240, the air outlet valve 250, the hydrogen gas inlet valve 330, and the hydrogen gas outlet valve 370. The controller 500, the air inlet valve 240, the air outlet valve 250, the hydrogen gas inlet valve 330, and the hydrogen gas outlet valve 370 can be operated by a battery (not illustrated) even after the fuel cell system 10 is stopped.

Figure 2:
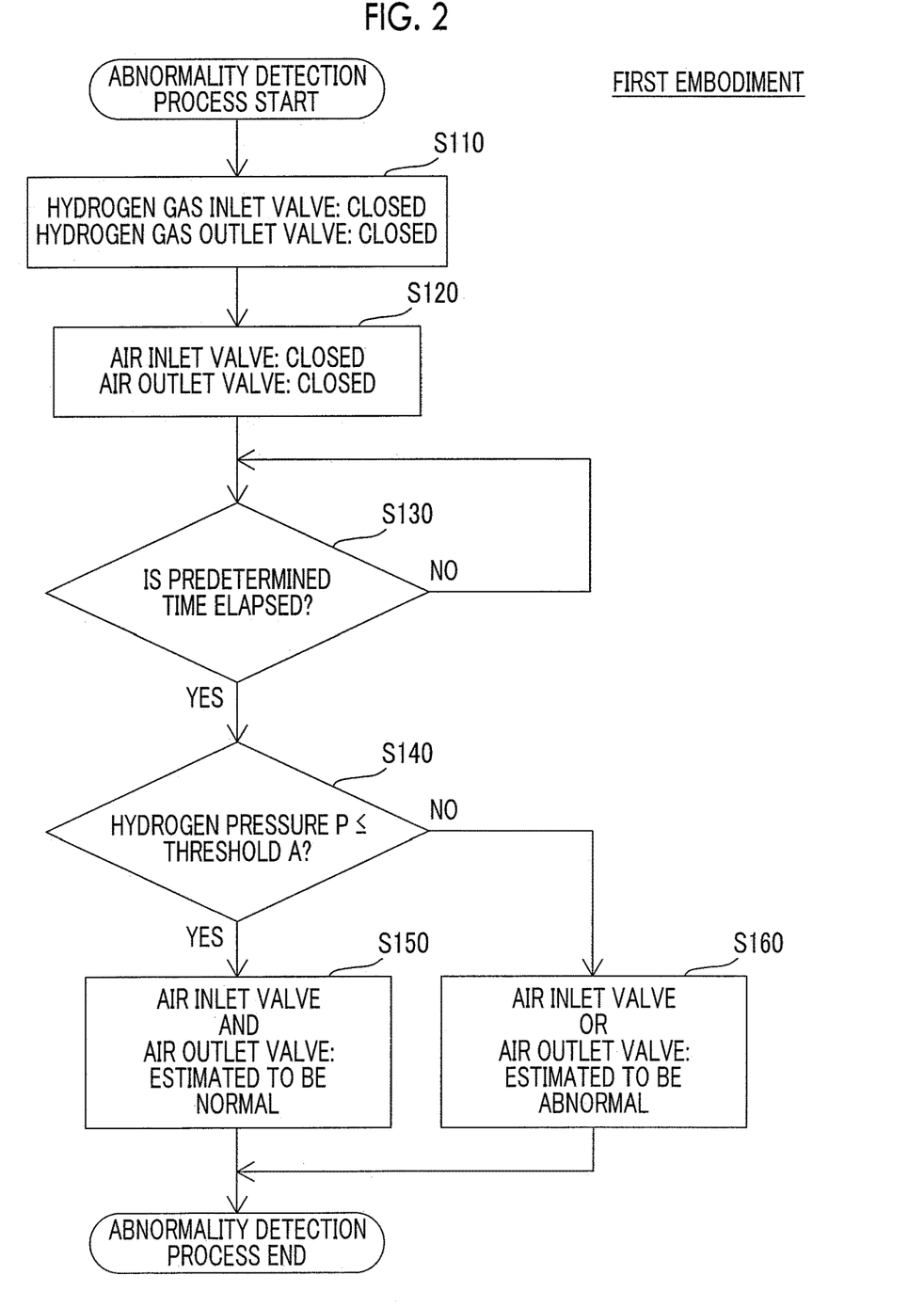
FIG. 2 is a flowchart showing an abnormality detection process according to the first embodiment.

FIG. 2 is a flowchart showing an abnormality detection process according to the first embodiment that is performed by the controller 500. In the first embodiment, the process is performed by the controller 500 after an operation for stopping the fuel cell system 10 is performed. In the first embodiment, the operation for stopping the fuel cell system 10 refers to an operation of turning off a start switch 510 of the fuel cell system 10. First, the controller 500 causes the hydrogen gas inlet valve 330 and the hydrogen gas outlet valve 370 to be closed (step S110). The controller 500 causes the air inlet valve 240 and the air outlet valve 250 to be closed (step S120). Any one of step S110 and step S120 may be performed first, or both step S110 and step S120 may be performed at the same time. In the first embodiment, in step S110, the controller 500 causes the hydrogen gas outlet valve 370 to be closed and then controls the hydrogen gas supply portion 320 and the hydrogen gas inlet valve 330 such that the hydrogen gas passage 310 is pressurized to a predetermined pressure. Next, the controller 500 causes the main stop valve of the hydrogen gas supply portion 320 and the hydrogen gas inlet valve 330 to be closed. In step S120, the controller 500 causes the compressor 230 to be stopped and causes the air inlet valve 240 and the air outlet valve 250 to be closed. By performing step S110 and step S120, the power generation by the fuel cell 100 is stopped.

Next, the controller 500 determines whether or not a predetermined period (for example, 3 hours after the air inlet valve 240 and the air outlet valve 250 are caused to be closed) is elapsed (step S130). "The predetermined period" can be determined by experimentally obtaining in advance a period taken to stabilize the pressure P of gas in the hydrogen gas passage 310 after causing the air inlet valve 240, the air outlet valve 250, the hydrogen gas inlet valve 330, and the hydrogen gas outlet valve 370 to be closed in a case where the air inlet valve 240, the air outlet valve 250, the hydrogen gas inlet valve 330, and the hydrogen gas outlet valve 370 are closed normally. In a case where the predetermined period is not elapsed (step S130: NO), the controller 500 counts the elapsed time up and returns to step S130.

On the other hand, in a case where the predetermined period is elapsed (step S130: YES), the controller 500 determines whether or not the pressure P of gas in the hydrogen gas passage 310 is lower than or equal to a predetermined value (threshold A) (Step S140). In the first embodiment, "the threshold A" is a value determined based on the pressure of gas in the hydrogen gas passage 310 when the predetermined period is elapsed in a case where the air inlet valve 240, the air outlet valve 250, the hydrogen gas inlet valve 330, and the hydrogen gas outlet valve 370 are closed normally. The threshold A may be, for example, a pressure that is slightly lower than the atmospheric pressure. In a case where the pressure P of gas in the hydrogen gas passage 310 is lower than or equal to the threshold A (step S140: YES), the controller 500 estimates that the air inlet valve 240 and the air outlet valve 250 are closed normally (step S150). On the other hand, in a case where the pressure P of gas in the hydrogen gas passage 310 is not lower than or equal to the threshold A (step S140: NO), the controller 500 estimates that at least one of the air inlet valve 240 or the air outlet valve 250 is abnormal (step S160). "Abnormal"

refers to a state where the valve is not closed normally. In a case where at least one of the air inlet valve 240 or the air outlet valve 250 is abnormal, the controller 500 records the detection of abnormality on the memory in a nonvolatile manner. As a result, for example, a diagnosis device connected to the controller 500 reads the record such that a user can recognize that the abnormality occurs in the fuel cell system 10.

Figure 3:
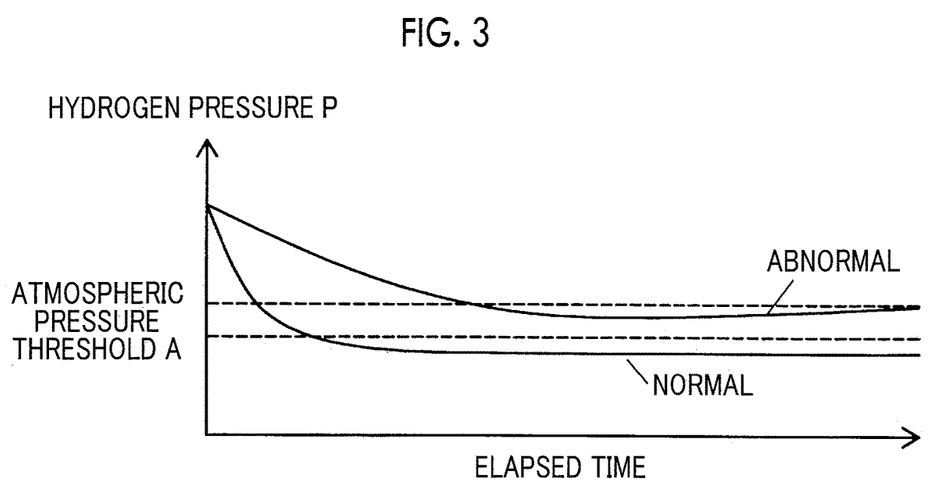
FIG. 3 is a graph showing a change over time in a pressure obtained by a hydrogen gas pressure sensor.

FIG. 3 is a graph showing a change over time in the pressure P obtained by the hydrogen gas pressure sensor 340. The graph shows the pressure P of gas in the hydrogen gas passage 310 with respect to the elapsed time after the air inlet valve 240, the air outlet valve 250, the hydrogen gas inlet valve 330, and the hydrogen gas outlet valve 370 are caused to be closed. In an initial state (the left end of the graph), the inside of the hydrogen gas passage 310 is pressurized by the supply of the hydrogen gas from the hydrogen gas supply portion 320. This configuration is adopted to further suppress deterioration of the membrane electrode assembly caused when hydrogen gas and oxygen remaining in the fuel cell 100 react with each other in a cell surface in a non-uniform state while the power generation of the fuel cell system 10 is stopped. Therefore, the pressure P of gas in the hydrogen gas passage 310 is higher than the atmospheric pressure. On the air passage 210 side, the pressure of gas in the air supply passage 211 is the same as the atmospheric pressure because the compressor 230 is stopped when the controller 500 causes the air inlet valve 240 to be closed. An outlet port of the air exhaust passage 212 communicates with the outside air. Therefore, the pressure of gas in the air exhaust passage 212 is also the same as the atmospheric pressure.

After the air inlet valve 240, the air outlet valve 250, the hydrogen gas inlet valve 330, and the hydrogen gas outlet valve 370 are caused to be closed, the hydrogen gas in the hydrogen gas passage 310 permeates from the anode side into the cathode side through the membrane electrode assembly of the fuel cell 100. Therefore, the pressure P of gas in the hydrogen gas passage 310 decreases over time. In a case where the hydrogen gas permeates into the cathode side, the hydrogen gas reacts with oxygen included in the air in the air passage 210 to produce water. Due to the reaction the hydrogen gas and the oxygen in the air passage 210 are consumed such that the pressure of gas in the air passage 210 decreases.

In a case where the air inlet valve 240 and the air outlet valve 250 are closed normally, the air passage 210 between the air inlet valve 240 and the air outlet valve 250 is sealed. Therefore, the pressure of gas in the air passage 210 between the air inlet valve 240 and the air outlet valve 250 decreases to a pressure (negative pressure) lower than the atmospheric pressure because the hydrogen gas permeating from the anode side and the oxygen included in the air react with each other to be consumed. The pressure P of gas in the hydrogen gas passage 310 also decrease to a negative pressure due to the permeation of the hydrogen gas into the cathode side.

On the other hand, in a case where at least one of the air inlet valve 240 or the air outlet valve 250 is abnormal, the air passage 210 between the air inlet valve 240 and the air outlet valve 250 is not sealed. Therefore, since air flows into the air passage 210, the pressure of gas in the air passage 210 between the air inlet valve 240 and the air outlet valve 250 is higher than that in a case where the air inlet valve 240 and the air outlet valve 250 are closed normally (is the same as the atmospheric pressure). Accordingly, the amount of hydrogen gas permeating into the anode side is smaller than that in a case where the air inlet valve 240 and the air outlet valve 250 are closed normally. Therefore, the pressure P of gas in the hydrogen gas passage 310 is also higher than that in a case where the air inlet valve 240 and the air outlet valve 250 are closed normally (is the same as the atmospheric pressure). Accordingly, in the first embodiment, by measuring the pressure P of gas in the hydrogen gas passage 310, whether or not the air inlet valve 240 and the air outlet valve 250 disposed on the air passage 210 side are abnormal can be estimated.

In the fuel cell system 10 according to the first embodiment, whether or not the air inlet valve 240 and the air outlet valve 250 are closed normally can be estimated by using the hydrogen gas pressure sensor 340 for adjusting the amount of hydrogen gas supplied from the hydrogen gas inlet valve 330 to the fuel cell 100 without disposing an air pressure sensor for obtaining the pressure of gas in the air passage 210. Accordingly, the structure of the fuel cell system 10 can be simplified, and the costs can be further reduced.

According to the first embodiment, whether or not the air inlet valve 240 and the air outlet valve 250 are closed normally can be estimated based on whether or not the pressure P of gas in the hydrogen gas passage 310 obtained by the hydrogen gas pressure sensor 340 is lower than or equal to the predetermined value (threshold A). Therefore, whether or not the air inlet valve 240 and the air outlet valve 250 are abnormal can be estimated based on a state of a decrease in the pressure P. According to the first embodiment, whether or not the air inlet valve 240 and the air outlet valve 250 are closed normally can be easily estimated by a simple comparison operation between the pressure P and the threshold A.

According to the first embodiment, whether or not the air inlet valve 240 and the air outlet valve 250 are closed normally can be estimated based on whether or not the pressure P of gas in the hydrogen gas passage 310 obtained by hydrogen gas pressure sensor 340 is lower than or equal to the pressure of gas in the hydrogen gas passage 310 when the predetermined period is elapsed in a case where the air inlet valve 240, the air outlet valve 250, the hydrogen gas inlet valve 330, and the hydrogen gas outlet valve 370 are closed normally. Therefore, whether or not the air inlet valve 240 and the air outlet valve 250 are closed normally can be accurately estimated based on the pressure in a case where the air inlet valve 240 and the air outlet valve 250 are closed normally.

B. Second Embodiment

Figure 4:
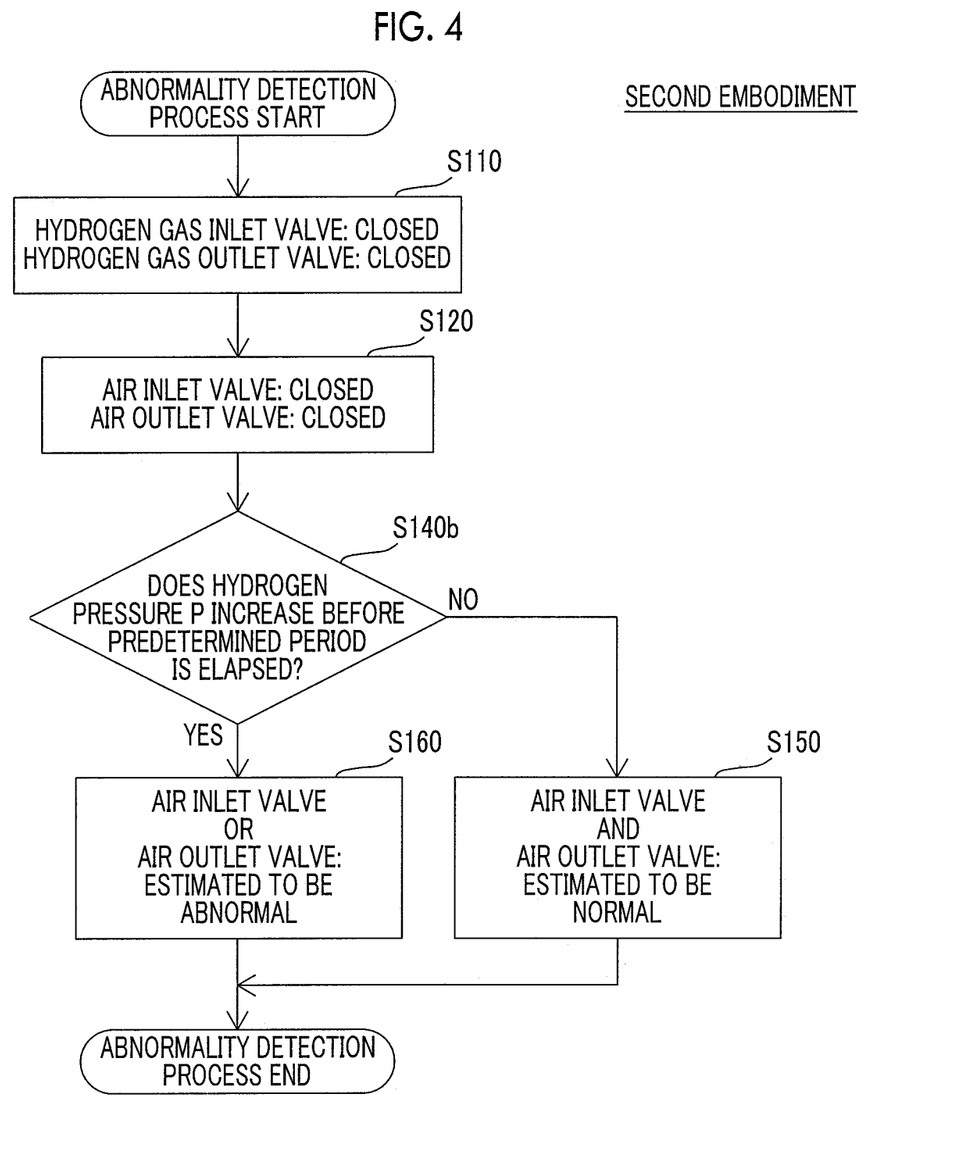
FIG. 4 is a flowchart showing an abnormality detection process according to a second embodiment.

FIG. 4 is a flowchart showing an abnormality detection process according to a second embodiment. In the second embodiment, the configuration of the fuel cell system 10 is the same as that of the first embodiment (FIG. 1). The content of the abnormality detection process according to the second embodiment is different from that of the first embodiment (FIG. 2). In FIG. 4, the same content of the process as that of FIG. 2 will be described using the same step numbers as those of FIG. 2.

In the fuel cell system 10 according to the second embodiment, the controller 500 causes the hydrogen gas inlet valve 330 and the hydrogen gas outlet valve 370 to be closed (step S110), and causes the air inlet valve 240 and the air outlet valve 250 to be closed (step S120). Next, the controller 500 determines whether or not a period in which the pressure P of gas in the hydrogen gas passage 310 obtained by hydrogen gas pressure sensor 340 increases is present in a predetermined period in which the pressure of gas in the hydrogen gas passage 310 decreases (step S140b). In a case where the period in which the pressure P of gas in the hydrogen gas passage 310 increases is not present (step S140b: NO), the controller 500 estimates that the air inlet valve 240 and the air outlet valve 250 are closed normally (step S150). On the other hand, in a case where the period in which the pressure P of gas in the hydrogen gas passage 310 increases is present (step S140b: YES), the air passage 210 between the air inlet valve 240 and the air outlet valve 250 is not sealed, and air may flow into the air passage 210. Therefore, the controller 500 estimates that at least one of the air inlet valve 240 or the air outlet valve 250 is abnormal (step S160). In the second embodiment, "the predetermined period" is, for example, the same as "the predetermined period" in the first embodiment.

In the fuel cell system 10 according to the second embodiment, whether or not the air inlet valve 240 and the air outlet valve 250 are closed normally can be estimated based on whether or not the period in which the pressure P of gas in the hydrogen gas passage 310 obtained by hydrogen gas pressure sensor 340 increases is present in the predetermined period in which the pressure of gas in the hydrogen gas passage 310 decreases. Therefore, in the second embodiment, whether or not the air inlet valve 240 and the air outlet valve 250 are abnormal can be estimated based on a state of a decrease in the pressure P. According to the second embodiment, whether or not the air inlet valve 240 and the air outlet valve 250 are closed normally can be easily estimated based on whether or not an increase in the pressure P is present.

C. Third Embodiment

Figure 5:
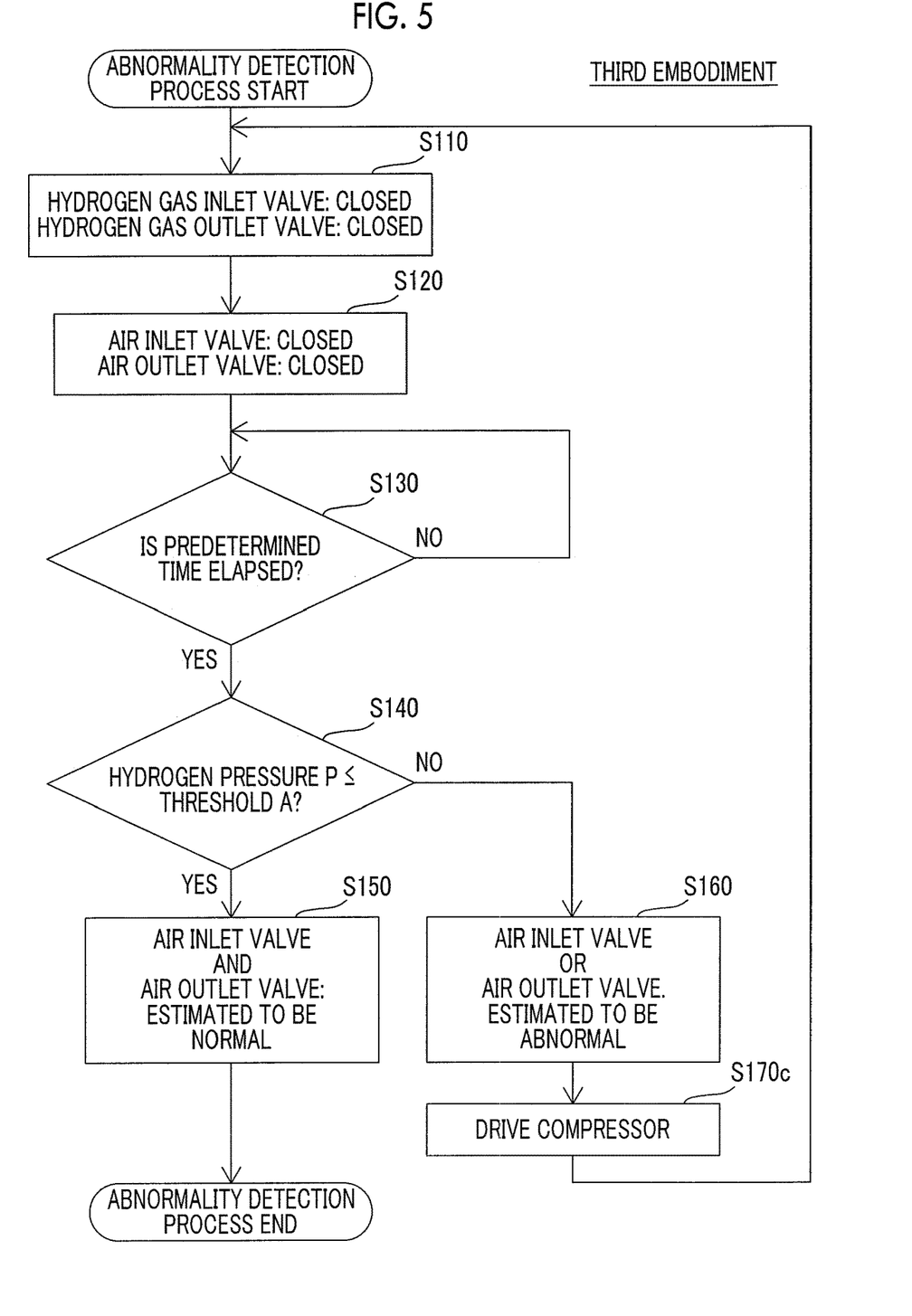
FIG. 5 is a flowchart showing an abnormality detection process according to a third embodiment.

FIG. 5 is a flowchart showing an abnormality detection process according to a third embodiment. In the third embodiment, the configuration of the fuel cell system 10 is the same as that of the first embodiment (FIG. 1). The content of the abnormality detection process according to the third embodiment is different from that of the first embodiment (FIG. 2). In FIG. 5, the same content of the process as that of FIG. 2 will be described using the same step numbers as those of FIG. 2.

Regarding the abnormality detection process, different points from the first embodiment will be described. In the fuel cell system 10 according to the third embodiment, in a case where the controller 500 estimates that at least one of the air inlet valve 240 or the air outlet valve 250 is abnormal (step S160), the controller 500 causes the compressor 230 disposed upstream of the air inlet valve 240 of the air passage 210 to be driven (step S170c). By the compressor 230 being driven, air is blown toward the air inlet valve 240 and the air outlet valve 250. Therefore, in a case where at least one of the air inlet valve 240 or the air outlet valve 250 is not closed normally by foreign matter being embedded therein, the foreign matter can be removed by blowing air to the foreign matter. After the driving of the compressor 230, the controller 500 returns to step S110 and performs the abnormality detection process. The driving of the compressor 230 is not particularly limited and is preferably performed after causing the air inlet valve 240 and the air outlet valve 250 to be open. In a case where the abnormality is not solved even after performing the driving of the compressor 230, for example, three times, the controller 500 may end the process without returning to step S110.

In the fuel cell system 10 according to the third embodiment, in a case where at least one of the air inlet valve 240 or the air outlet valve 250 is not closed normally by foreign matter being embedded therein, the foreign matter can be removed by driving the compressor 230. As a result, the abnormality caused by the embedding of the foreign matter into the air inlet valve 240 or the air outlet valve 250 can be solved.

In the above description, the third embodiment is combined with the first embodiment. However, the third embodiment may be combined with the second embodiment. In this case, the controller 500 performs step S170c after step S160 shown in FIG. 4.

D. Fourth Embodiment

Figure 6:
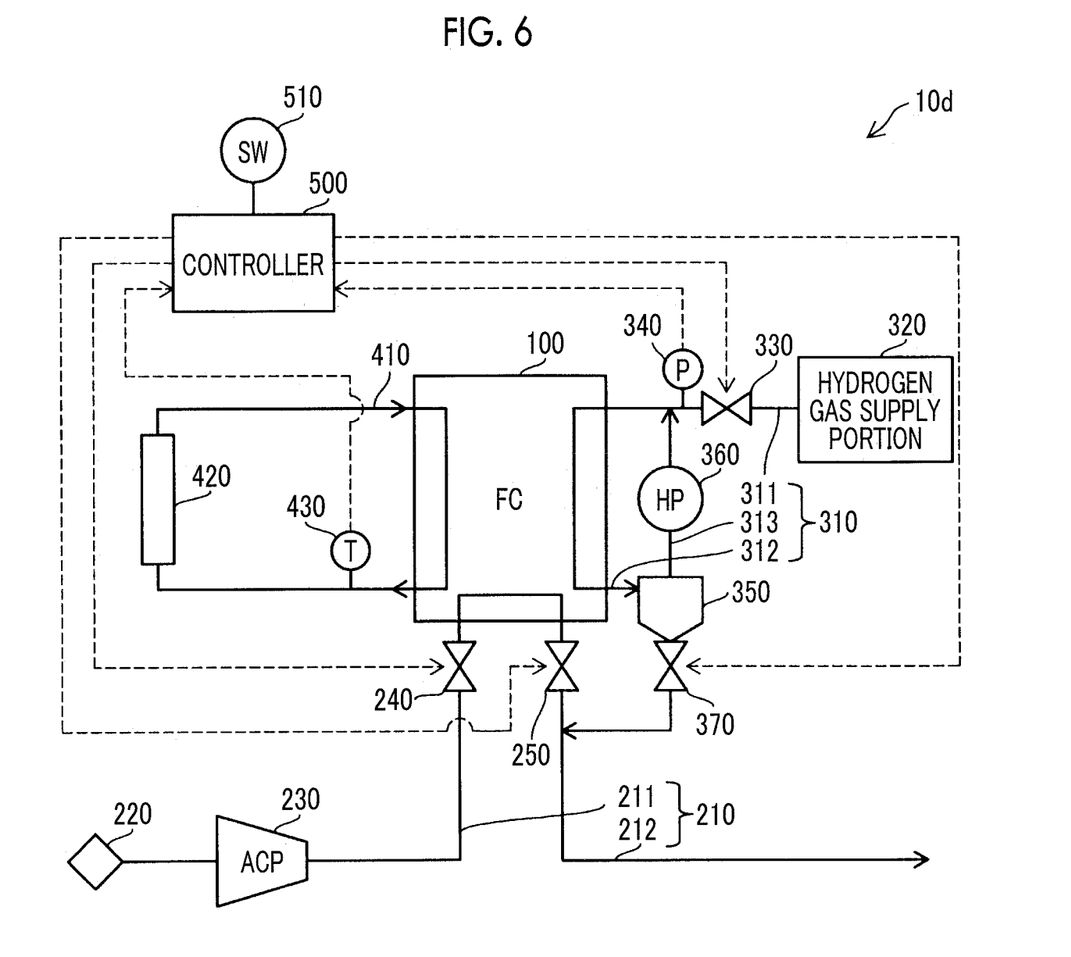
FIG. 6 is a diagram showing the summary of a fuel cell system according to a fourth embodiment.
Figure 7:
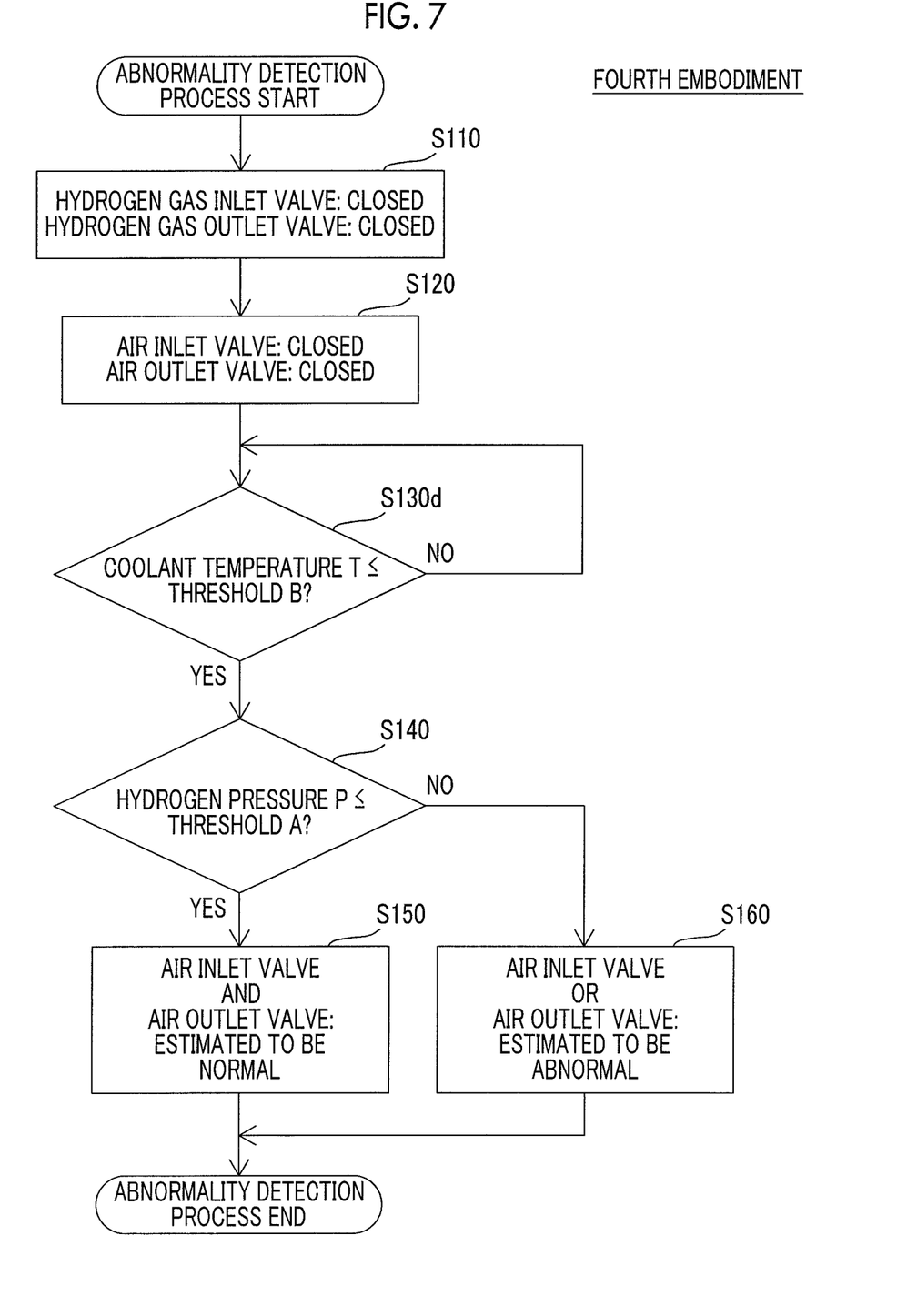
FIG. 7 is a flowchart showing an abnormality detection process according to the fourth embodiment.

FIG. 6 is a diagram showing the summary of a fuel cell system 10d according to a fourth embodiment. FIG. 7 is a flowchart showing an abnormality detection process according to a fourth embodiment. The fuel cell system 10d according to the fourth embodiment is different from that according to the first embodiment (FIG. 1), in that a temperature sensor 430 is provided in the coolant passage 410. The abnormality detection process according to the fourth embodiment is different from that according to the first embodiment (FIG. 2).

The temperature sensor 430 is disposed in the coolant passage 410 on a side where the coolant is exhausted from the fuel cell 100. The controller 500 indirectly obtains (estimates) a temperature of gas in the hydrogen gas passage 310 by causing the temperature sensor 430 to obtain a temperature T of the coolant flowing through the coolant passage 410. Instead of disposing the temperature sensor 430 in the coolant passage 410, for example, the temperature sensor 430 may be attached to the fuel cell 100 or the hydrogen gas passage 310 to obtain (estimate) a temperature of gas in the hydrogen gas passage 310 based on the measured temperature.

In the fuel cell system 10d according to the fourth embodiment, the controller 500 causes the hydrogen gas inlet valve 330 and the hydrogen gas outlet valve 370 to be closed (step S110), and causes the air inlet valve 240 and the air outlet valve 250 to be closed (step S120). Next, the controller 500 determines whether or not the temperature T obtained by the temperature sensor 430 is lower than or equal to a predetermined value (threshold B) (step S130d). "The threshold B" refers to, for example, normal temperature (35 degrees Celsius). In a case where the temperature T is not lower than or equal to the threshold B (step S130d: NO), the controller 500 repeats the process of step S130d until the temperature T becomes lower than or equal to threshold B (step S130d: YES). On the other hand, in a case where the temperature T is lower than or equal to the threshold B (step S130d: YES), the controller 500 determines whether or not the pressure P of gas in the hydrogen gas passage 310 is lower than or equal to the threshold A (Step S140). In a case where the pressure P of gas in the hydrogen gas passage 310 is lower than or equal to the threshold A (step S140: YES), the controller 500 estimates that the air inlet valve 240 and the air outlet valve 250 are closed normally (step S150). On the other hand, in a case where the pressure P of gas in the hydrogen gas passage 310 is not lower than or equal to the threshold A (step S140: NO), the controller 500 estimates that at least one of the air inlet valve 240 or the air outlet valve 250 is abnormal (step S160). Instead of a fixed value such as normal temperature, the threshold B may be an ambient temperature at that time measured by an ambient temperature sensor.

In the fuel cell system 10d according to the fourth embodiment, in a case where whether or not the air inlet valve 240 and the air outlet valve 250 are closed normally is estimated using the pressure P of gas in the hydrogen gas passage 310 obtained by the hydrogen gas pressure sensor 340, an effect of the temperature on the change of the pressure in the hydrogen gas passage can be further suppressed. Therefore, whether or not the air inlet valve 240 and the air outlet valve 250 are closed normally can be more appropriately estimated.

In the above description, the fourth embodiment is combined with the first embodiment. However, the fourth embodiment may be combined with the second embodiment. In this case, the controller 500 performs step S140b shown in FIG. 4 after step S130d.

By combining the fourth embodiment with the third embodiment, in a case where the controller 500 estimates that at least one of the air inlet valve 240 or the air outlet valve 250 is abnormal (step S160), the controller 500 may perform the driving of the compressor 230 (FIG. 5, step S170c).

E. Fifth Embodiment

Figure 8:
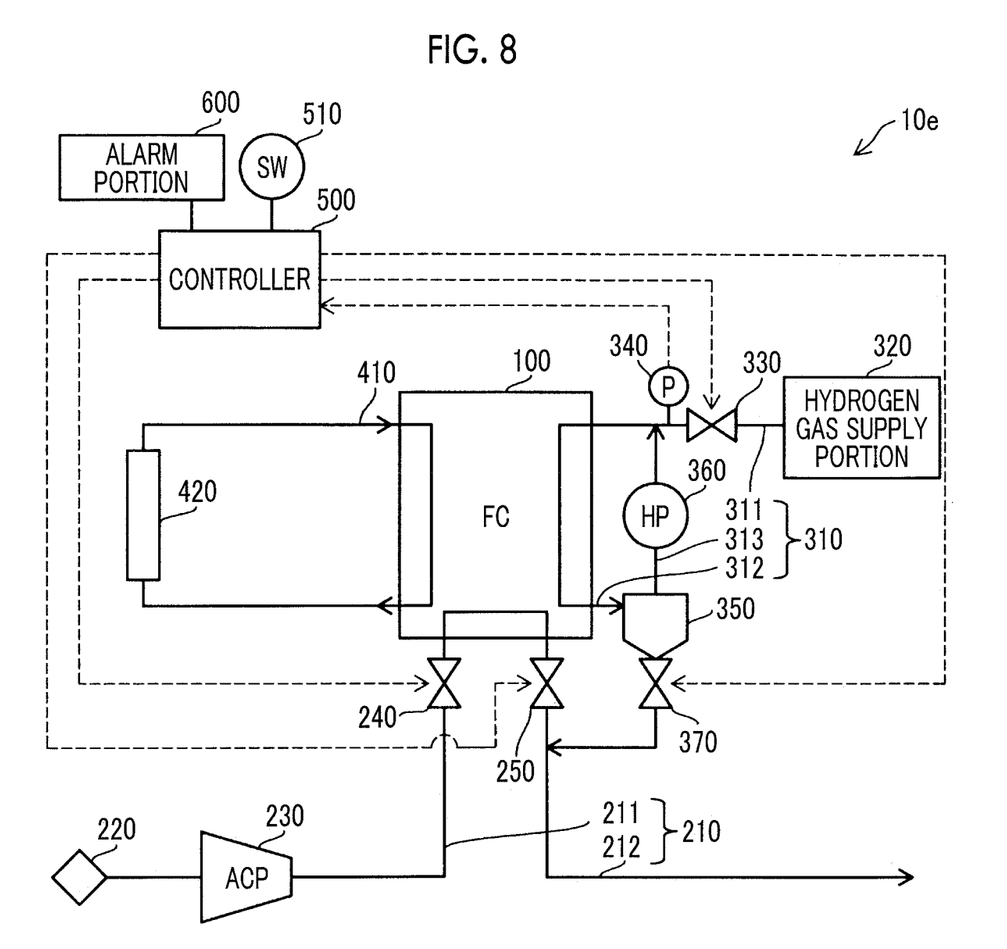
FIG. 8 is a diagram showing the summary of a fuel cell system according to a fifth embodiment.
Figure 9:
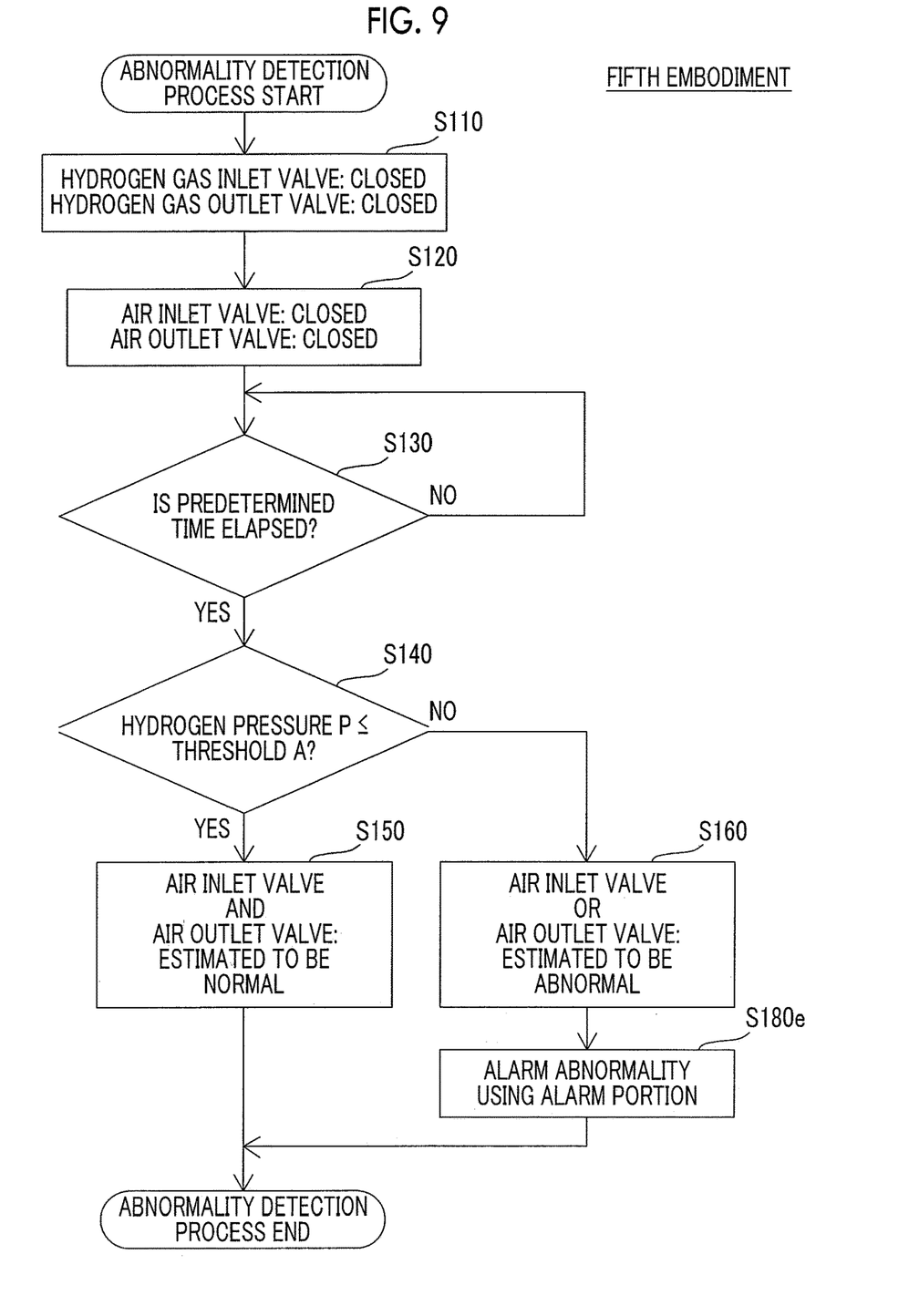
FIG. 9 is a flowchart showing an abnormality detection process according to the fifth embodiment.

FIG. 8 is a diagram showing the summary of a fuel cell system 10e according to a fifth embodiment. FIG. 9 is a flowchart showing an abnormality detection process according to the fifth embodiment. The fuel cell system 10e according to the fifth embodiment is different from that according to the first embodiment (FIG. 1), in that the fuel cell system 10e includes an alarm portion 600. The abnormality detection process according to the fifth embodiment is different from that according to the first embodiment (FIG. 2).

The alarm portion 600 alarms that at least one of the air inlet valve 240 or the air outlet valve 250 is abnormal. For example, in a case where the fuel cell system 10e is mounted on a fuel cell vehicle, the alarm portion 600 may display a warning or the like regarding an abnormality on an instrument panel of the fuel cell vehicle. The alarm portion 600 may alarm an abnormality using a warning sound generated by a buzzer.

Regarding the abnormality detection process, different points from the first embodiment will be described. In the fuel cell system 10e according to the fifth embodiment, in a case where the controller 500 estimates that at least one of the air inlet valve 240 or the air outlet valve 250 is abnormal (step S160), the controller 500 causes the alarm portion 600 to alarm that at least one of the air inlet valve 240 or the air outlet valve 250 is abnormal (step S180e).

In the fuel cell system 10e according to the fifth embodiment, in a case where the air inlet valve 240 and the air outlet valve 250 are not closed normally, the alarm portion 600 alarms an abnormality. Therefore, the alarm portion 600 can urge a user to repair or inspect the fuel cell system 10e. As a result, deterioration of the membrane electrode assembly of the fuel cell 100 caused by being exposed to the air for a long period of time can be further suppressed.

In the above description, the fifth embodiment is combined with the first embodiment. However, the fifth embodiment may be combined with any one of the second to fourth embodiments. For example, by combining the fifth embodiment with the third embodiment, in a case where an abnormality is not solved even after performing the driving of the compressor 230 (FIG. 5, step S170c), the controller 500 may cause the alarm portion 600 to alarm that at least one of the air inlet valve 240 or the air outlet valve 250 is abnormal (FIG. 9, step S180e).

F. Another Embodiment 1

In step S140 of the abnormality detection process shown in FIG. 2, the controller 500 determines whether or not the pressure P of gas in the hydrogen gas passage 310 is lower than or equal to the threshold A. On the other hand, the controller 500 may determine whether or not the air inlet valve 240 and the air outlet valve 250 are closed normally based on an average change rate Q of the pressure P of gas in the hydrogen gas passage 310 in the predetermined period. As shown in the following Expression (1), the average change rate Q can be obtained using a pressure P1 of gas in the hydrogen gas passage 310 at time t1 and a pressure P2 of gas in the hydrogen gas passage 310 at time t2 following time t1.

$$Q=(P2-P1)/(t2-t1) \tag{1}$$

In this case, the controller 500 can estimate that the air inlet valve 240 and the air outlet valve 250 are abnormal in a case where the average change rate Q is higher than or equal to a threshold C. "The threshold C" can be determined based on Expression (1) by experimentally obtaining in advance the pressure P1 of gas in the hydrogen gas passage 310 at time t1 and the pressure P2 of gas in the hydrogen gas passage 310 at time t2 following time t1 in a case where the air inlet valve 240, the air outlet valve 250, the hydrogen gas inlet valve 330, and the hydrogen gas outlet valve 370 are closed normally. Even in a case where the abnormality detection process using the average change rate Q of the pressure P is performed, whether or not the air inlet valve 240 and the air outlet valve 250 are abnormal can be estimated based on a state of a decrease in the pressure P of gas in the hydrogen gas passage 310.

G. Another Embodiment 2

In step S170c of the abnormality detection process shown in FIG. 5, in a case where the controller 500 estimates that at least one of the air inlet valve 240 or the air outlet valve 250 is abnormal, the controller 500 causes the compressor 230 to be driven. On the other hand, the controller 500 may cause not only the compressor 230 but also hydrogen gas supply portion 320 to be driven. "Causing the hydrogen gas supply portion 320 to be driven" represents that the controller 500 causes the main stop valve of the hydrogen tank to be open. By the hydrogen gas supply portion 320 being driven, hydrogen gas can be blown toward the hydrogen gas inlet valve 330 and the hydrogen gas outlet valve 370. As a result, both of an abnormality caused by the embedding of foreign matter into the air inlet valve 240 or the air outlet valve 250 and an abnormality caused by the embedding of foreign matter into the hydrogen gas inlet valve 330 or the hydrogen gas outlet valve 370 can be solved. Although not particularly limited, it is preferable that the controller 500 causes the hydrogen gas inlet valve 330 and the hydrogen gas outlet valve 370 to be open before causing the hydrogen gas supply portion 320 to be driven. Instead of causing the compressor 230 and the hydrogen gas supply portion 320 to be driven, the controller 500 may cause the hydrogen gas supply portion 320 to be driven in a case where an abnormality is not solved even after performing the driving of the compressor 230 several times. In this case, the consumption of the hydrogen gas can be further suppressed as compared to a case where not only the compressor 230 but also the hydrogen gas supply portion 320 are driven.

The disclosure is not limited to the above-described embodiments, and various configurations can be realized within a scope not departing from the scope of the disclosure. For example, in order to solve some or all of the above-described problems, or to achieve some or all of the above-described effects, the technical features in the embodiments corresponding to the technical features in the respective aspects described in "SUMMARY" can be appropriately replaced or combined with each other. Unless specified as indispensable features in this specification, the technical features can be appropriately removed.

What is claimed is:

1. A fuel cell system comprising:
   a fuel cell;
   an air passage including an air supply passage through which air is supplied to the fuel cell and an air exhaust passage through which the air is exhausted from the fuel cell;
   an air inlet valve configured to open and close the air supply passage;
   an air outlet valve configured to open and close the air exhaust passage;
   a hydrogen gas passage including a hydrogen gas supply passage through which hydrogen gas is supplied to the fuel cell and a hydrogen gas exhaust passage through which the hydrogen gas is exhausted from the fuel cell;
   a hydrogen gas inlet valve configured to open and close the hydrogen gas supply passage;
   a hydrogen gas outlet valve configured to open and close the hydrogen gas exhaust passage;
   a hydrogen gas pressure sensor configured to obtain a pressure of gas in the hydrogen gas passage disposed downstream of the hydrogen gas inlet valve and upstream of the hydrogen gas outlet valve; and
   a controller configured to estimate whether or not the air inlet valve and the air outlet valve are closed normally based on a state of a decrease in the pressure obtained by the hydrogen gas pressure sensor after causing the hydrogen gas inlet valve, the hydrogen gas outlet valve, the air inlet valve, and the air outlet valve to be closed.

2. The fuel cell system according to claim 1, wherein when a predetermined period is elapsed after causing the hydrogen gas inlet valve, the hydrogen gas outlet valve, the air inlet valve, and the air outlet valve to be closed, the controller is configured to
   estimate that the air inlet valve and the air outlet valve are closed normally in a case where the decreased pressure is lower than or equal to a predetermined value, and
   estimate that at least one of the air inlet valve or the air outlet valve is not closed normally in a case where the decreased pressure is not lower than or equal to a predetermined value.

3. The fuel cell system according to claim 2, wherein the predetermined value is a value determined based on the decreased pressure when the predetermined period is elapsed in a case where the air inlet valve, the air outlet valve, the hydrogen gas inlet valve, and the hydrogen gas outlet valve are closed normally.

4. The fuel cell system according to claim 1, wherein in a predetermined period in which the pressure decreases after causing the hydrogen gas inlet valve, the hydrogen gas outlet valve, the air inlet valve, and the air outlet valve to be closed, the controller is configured to
   estimate that at least one of the air inlet valve or the air outlet valve is not closed normally in a case where a period in which the pressure increases is present, and
   estimate that the air inlet valve and the air outlet valve are closed normally in a case where the period in which the pressure increases is not present.

5. The fuel cell system according to claim 1, further comprising a compressor configured to supply compressed air to the fuel cell, the compressor being disposed upstream of the air inlet valve of the air passage,
   wherein the controller is configured to drive the compressor in a case where the controller estimates that at least one of the air inlet valve or the air outlet valve is not closed normally.

6. The fuel cell system according to claim 1, further comprising a temperature sensor configured to obtain a temperature of gas in the hydrogen gas passage,
   wherein the controller is configured to estimate whether or not the air inlet valve and the air outlet valve are closed normally based on the pressure obtained by the hydrogen gas pressure sensor in a case where the temperature obtained by the temperature sensor is lower than or equal to a predetermined value.

7. The fuel cell system according to claim 1, further comprising an alarm portion configured to alarm that at least one of the air inlet valve or the air outlet valve is not closed normally,
   wherein the controller is configured to cause the alarm portion to alarm an abnormality in a case where the controller estimates that at least one of the air inlet valve or the air outlet valve is not closed normally.

8. An abnormality diagnosis method for a fuel cell system, the abnormality diagnosis method comprising:
   obtaining a pressure of gas in a hydrogen gas passage disposed downstream of a hydrogen gas inlet valve and upstream of a hydrogen gas outlet valve after causing the hydrogen gas inlet valve, the hydrogen gas outlet valve, an air inlet valve, and an air outlet valve to be closed, the hydrogen gas inlet valve being configured to open and close a hydrogen gas supply passage through which hydrogen gas is supplied to a fuel cell, the hydrogen gas outlet valve being configured to open and close a hydrogen gas exhaust passage through which the hydrogen gas is exhausted from the fuel cell, the air inlet valve being configured to open and close an air supply passage through which air is supplied to the fuel cell, and the air outlet valve being configured to open and close an air exhaust passage through which the air is exhausted from the fuel cell; and
   estimating whether or not the air inlet valve and the air outlet valve are closed normally based on a state of a decrease in the obtained pressure.

9. A fuel cell system comprising:
   a fuel cell;
   an air passage including an air supply passage through which air is supplied to the fuel cell and an air exhaust passage through which the air is exhausted from the fuel cell;
   an air inlet valve configured to open and close the air supply passage;
   an air outlet valve configured to open and close the air exhaust passage;
   a hydrogen gas passage including a hydrogen gas supply passage through which hydrogen gas is supplied to the fuel cell and a hydrogen gas exhaust passage through which the hydrogen gas is exhausted from the fuel cell;
   a hydrogen gas inlet valve configured to open and close the hydrogen gas supply passage;
   a hydrogen gas outlet valve configured to open and close the hydrogen gas exhaust passage;
   a hydrogen gas pressure sensor configured to obtain a pressure of gas in the hydrogen gas passage disposed downstream of the hydrogen gas inlet valve and upstream of the hydrogen gas outlet valve; and
   a controller programmed to estimate whether or not the air inlet valve and the air outlet valve are closed normally based on a state of a decrease in the pressure obtained by the hydrogen gas pressure sensor after causing the hydrogen gas inlet valve, the hydrogen gas outlet valve, the air inlet valve, and the air outlet valve to be closed.

\* \* \* \* \*